(12) United States Patent
Akazaki et al.

(10) Patent No.: US 7,637,244 B2
(45) Date of Patent: Dec. 29, 2009

(54) INTAKE AIR AMOUNT CONTROLLING APPARATUS FOR AN INTERNAL-COMBUSTION ENGINE

(75) Inventors: Shusuke Akazaki, Saitama (JP); Yuji Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/053,124

(22) Filed: Mar. 21, 2008

(65) Prior Publication Data
US 2008/0230930 A1 Sep. 25, 2008

(30) Foreign Application Priority Data
Mar. 23, 2007 (JP) .............. 2007-077645

(51) Int. Cl.
*F02D 9/10* (2006.01)
(52) U.S. Cl. .............. 123/337; 123/188.14; 123/308; 123/432
(58) Field of Classification Search ............ 123/188.14, 123/336, 337, 308, 432
See application file for complete search history.

(56) References Cited

U.S. PATENT DOCUMENTS

| 4,323,038 | A | * | 4/1982 | Motosugi et al. ....... 123/188.14 |
| 5,417,190 | A | * | 5/1995 | Ando et al. ................ 123/308 |
| 5,671,712 | A | * | 9/1997 | Uchida ...................... 123/308 |
| 5,799,638 | A | * | 9/1998 | Tsuchida et al. ........... 123/302 |
| 6,047,950 | A | * | 4/2000 | Pontoppidan et al. ..... 251/305 |
| 6,148,794 | A | * | 11/2000 | Tsuzuku et al. ......... 123/406.5 |
| 6,443,124 | B2 | * | 9/2002 | Yamaguchi et al. ........ 123/308 |
| 6,772,730 | B2 | * | 8/2004 | Kohlen ...................... 123/337 |
| 6,971,632 | B2 | * | 12/2005 | Elliot et al. ................ 251/305 |
| 7,128,050 | B1 | * | 10/2006 | Abe .......................... 123/306 |
| 2005/0274354 | A1 | * | 12/2005 | Suzuki et al. ............ 123/302 |
| 2007/0044754 | A1 | * | 3/2007 | Peffley et al. ............ 123/306 |
| 2007/0227495 | A1 | * | 10/2007 | Isaji et al. ................. 123/306 |

FOREIGN PATENT DOCUMENTS

JP 08-312358 11/1996

\* cited by examiner

*Primary Examiner*—Erick Solis
(74) *Attorney, Agent, or Firm*—Lahive & Cockfield, LLP; Anthony A. Laurentano, Esq.

(57) ABSTRACT

An intake air amount controlling apparatus of an engine is provided. The apparatus comprises an intake manifold that is branched from an intake manifold collecting portion of the engine. The intake manifold communicates with an intake port of a cylinder head of a corresponding cylinder. The apparatus further comprises a throttle valve in the intake manifold of the cylinder and a throttle bore provided in the intake manifold. The throttle bore has a curved surface. The throttle valve rotates such that one half of the throttle valve contacts with the curved surface of the throttle bore until the throttle valve reaches a predetermined opening degree. Thus, an air flow via the one half of the throttle valve is prevented from entering the intake port. An air flow via the other half of the throttle valve is allowed to enter the intake port. Areas of cross sections, which are orthogonal to an air flow passing in the intake manifold, of the intake manifold at upstream and downstream of the throttle valve are larger than an area of a cross section, which is orthogonal to an air flow entering the intake port, crossing an open face at which the intake manifold communicates with the intake port.

5 Claims, 8 Drawing Sheets

INTAKE AIR AMOUNT CONTROLLING APPARATUS FOR AN INTERNAL-COMBUSTION ENGINE

BACKGROUND OF THE INVENTION

The present invention relates to an intake air amount controlling apparatus for an internal-combustion engine (which will be hereinafter referred to as an "engine") that comprises a throttle valve in an intake passage for controlling the amount of intake air into the engine.

An intake air amount controlling apparatus that is capable of generating a tumble flow in a cylinder has been proposed so as to improve the fuel efficiency and the combustibility of the engine. Japanese Patent Application Publication No. H08-312358 discloses an intake air amount controlling apparatus in which a bore of a throttle valve is formed to have a curved surface and in which a main passage having a larger cross section and an auxiliary passage having a smaller cross section are separated by a partition that is placed immediately downstream of the throttle valve. When an engine load is low, the main passage is closed by one half of the throttle valve that contacts the curved surface of the bore, and the auxiliary passage is opened by the other half of the throttle valve. Thus, an air flow that passes through the auxiliary passage is biased to one direction inside an intake port, thereby generating a tumble flow within a cylinder. When an engine load is high, one half of the throttle valve leaves the curved surface of the bore so that the main passage is opened.

According to the above technique, the fuel efficiency and the combustibility can be improved with a simple structure while suppressing the cost because a tumble flow can be generated by a throttle valve without using a special mechanism.

However, according to the above technique, because the bore of the throttle valve is formed to have a curved surface so as to generate a tumble flow, the cross sectional area of the intake passage at the upstream of the throttle valve is smaller than the cross sectional area at the upstream end of the intake port of the cylinder head. Furthermore, because a partition is placed downstream of the throttle valve, the cross sectional area of the intake passage at the downstream of the throttle valve is also substantially smaller than the cross sectional area at the upstream end of the intake port of the cylinder head. Accordingly, depending on the operating condition of the engine, the amount of air passing through the throttle valve may be insufficient with respect to the amount of air entering the intake port of the cylinder head. As a result, the amount of air that is actually introduced into the cylinder may be insufficient with respect to the amount of intake air amount requested by the engine. A larger amount of intake air is requested by the engine when an engine load is high or when an engine rotational speed is high. In such a situation, the design of the above cross sectional areas may fail to introduce a desired amount of intake air into the cylinder. Moreover, a partition placed downstream of the throttle valve according to the above technique may be a resistance against the air flow toward the intake port, which may prevent a desired amount of intake air from being introduced into the cylinder.

The present invention aims at solving the above-described problems. Thus, it is one object of the present invention to propose an intake air amount controlling apparatus structured to prevent a shortage of an intake air amount introduced into a cylinder of an engine even in the operating condition where a larger amount of intake air is required.

SUMMARY OF THE INVENTION

According to one aspect of the invention, an intake air amount controlling apparatus of an engine is provided. The apparatus comprises an intake manifold that is branched from an intake manifold collecting portion of the engine. The intake manifold communicates with an intake port of a cylinder head of a corresponding cylinder. The apparatus further comprises a throttle valve provided in the intake manifold of the cylinder and a throttle bore provided in the intake manifold. The throttle bore has a curved surface. The throttle valve rotates such that one half of the throttle valve contacts with the curved surface of the throttle bore until the throttle valve reaches a predetermined opening degree. Thus, an air flow via the one half of the throttle valve is prevented from entering the intake port. An air flow via the other half of the throttle valve is allowed to enter the intake port. Areas of a cross section, which are orthogonal to an air flow passing through the intake manifold, of the intake manifold at upstream and downstream of the throttle valve are larger than an area of a cross section, which is orthogonal to an air flow entering the intake port, crossing an open face at which the intake manifold communicates with the intake port.

According to this invention, providing a throttle bore having a curved surface can generate a tumble flow within the cylinder when an opening degree of the throttle valve is smaller. On the other hand, cross sectional areas of the intake manifold at upstream and downstream of the throttle valve are larger than a cross sectional area at the upstream end of the intake port of the cylinder (that is, at the position at which the intake manifold communicates with the intake port). Therefore, it is prevented that the amount of air flow passing through the throttle valve is insufficient with respect to the amount of air flow entering the intake port. A shortage of intake air can be prevented even in the operating condition where a larger amount of intake air is requested by the engine. Thus, the invention prevents a shortage of intake air while keeping a structure that is capable of generating a tumble flow.

According to one embodiment of the present invention, the apparatus further comprises a rectification partition, which is provided downstream of the throttle valve, for stabilizing the air flow passing through the throttle valve and toward the intake port. The rectification partition is provided such that an area of a cross section, which is orthogonal to the air flow passing through the intake manifold, of the intake manifold at a position at which the rectification partition is placed is larger than the area of the cross section crossing the open face at which the intake manifold communicates with the intake port.

Providing a throttle bore may disturb an air flow passing through the throttle valve and toward the intake port. The present invention can prevent such disturbance by providing a rectification partition and smooth the air flow toward the intake port. Because the rectification partition is provided such that the cross sectional area of the intake manifold at a position at which the rectification partition is placed is larger than the cross sectional area at the upstream end of the intake port, the rectification partition is not a resistance against the air flow toward the intake port, which prevents occurrence of a shortage of the intake air amount.

According to one embodiment of the present invention, the rectification partition is provided to form a branch passage in the intake manifold at downstream of the throttle valve such that the branch passage is branched from a passage having the area of the cross section crossing the open face. One or both of an EGR gas and a blow-by gas is supplied to the branch passage.

According to this invention, because the rectification partition forms a branch from the passage that leads to the intake port such that an EGR gas and/or a blow-by gas are provided to the branch passage, the EGR gas and/or the blow-by gas can be supplied to the intake manifold without disturbing a flow of fresh air toward the intake port.

According to one embodiment of the present invention, when both of the EGR gas and the blow-by gas are supplied, the branch passage is further partitioned by a separator plate into individual passages such that each of the EGR gas and the blow-by gas is supplied into a corresponding one of the individual passages.

According to this invention, the EGR gas and the blow-by gas can be supplied to the intake manifold without mixing both of the EGR gas and the blow-by gas. Because the EGR gas and the blow-by gas are not mixed up, it can be prevented that the blow-by gas carbonizes the EGR gas.

According to one embodiment of the present invention, an upstream end of one or both of the passage for supplying the EGR gas and the passage for supplying the blow-by gas is shielded by a shield plate.

According to this invention, because the upstream end of one or both of the passages to which the EGR gas and the blow-by gas are supplied is shielded, a return of these gases to the upstream of the intake manifold can be prevented.

DESCRIPTION OF THE PREFERRED EMBODIMENTS

Figure 1:
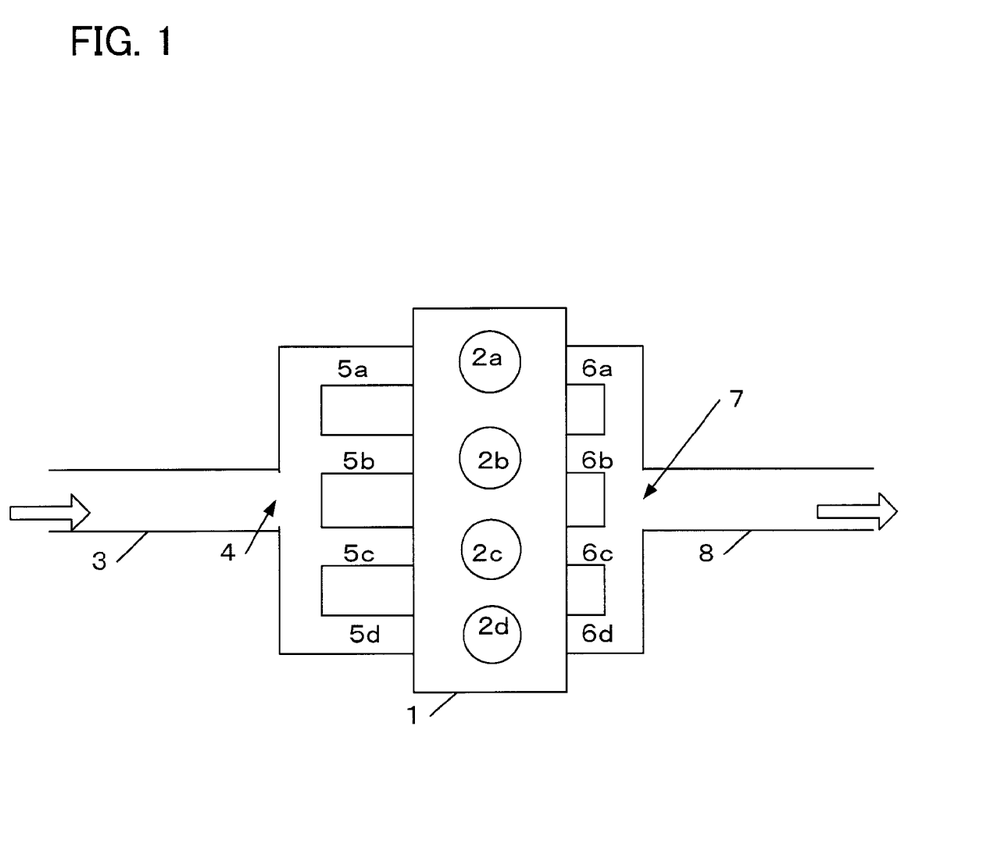
FIG. 1 schematically shows an engine in accordance with one embodiment of the present invention.

Preferred embodiments of the present invention will be described referring to the attached drawings. FIG. 1 schematically shows a structure of an engine in accordance with one embodiment of the present invention. In this example, an engine 1 has four cylinders 2a to 2d. Although these cylinders are arranged in series in FIG. 1, the present invention is not limited to such arrangement. The present invention can be applied to an engine having any number of cylinders.

An intake passage 3 is branched into four intake manifolds 5a to 5d at a collecting portion 4. Each intake manifold is connected to a corresponding one of the cylinders 2a to 2d. A fuel injection valve and a throttle valve (not shown in the figure) are provided in each intake manifold. The fuel injection valve injects fuel in accordance with a control signal from a control unit (ECU, not shown in the figure). An opening degree of the throttle valve is adjusted in accordance with a control signal from the control unit. An amount of air to be introduced into the cylinder can be controlled through an adjustment of the opening degree of the throttle valve. Exhaust manifolds 6a to 6d, each of which is connected to a corresponding one of the cylinders, are connected to an exhaust passage 8 at a collecting portion 7.

Figure 2:
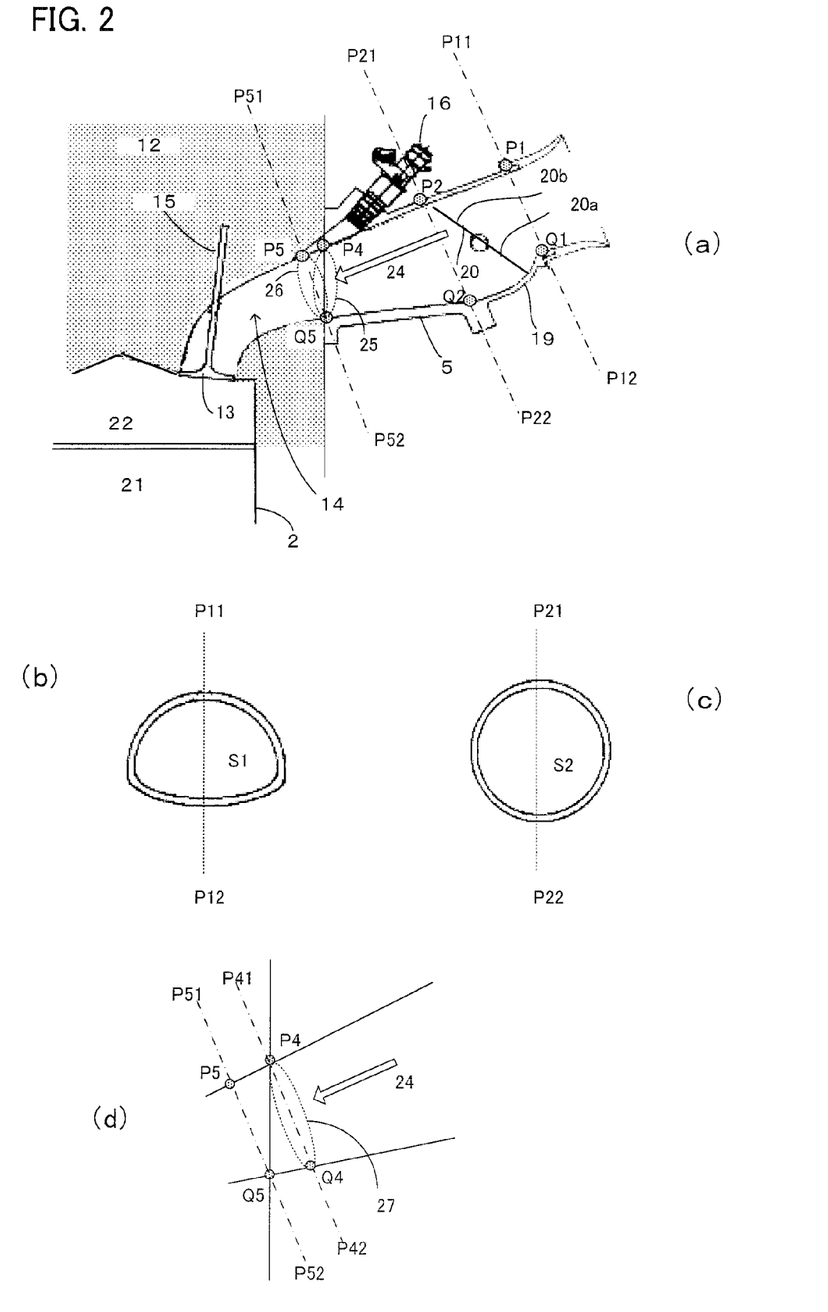
FIG. 2 shows an intake air amount controlling apparatus of an engine in accordance with a first embodiment of the present invention.

FIG. 2 shows an intake air amount controlling apparatus having a structure that is capable of generating a tumble flow within a cylinder shown in FIG. 1 in accordance with a first embodiment of the present invention.

Referring to FIG. 2(a), a cylinder head 12 (shown by a shaded area in the figure) is attached to the upper end of the cylinder 2. An intake inlet 13 and an exhaust outlet (not shown) are provided in the cylinder 2. The intake inlet 13 is connected to an intake port 14 formed in the cylinder head 12 and the exhaust outlet is connected to an exhaust port (not shown) formed in the cylinder head. An intake valve 15 for opening/closing the inlet 13 is provided. An actuator (not shown) is connected to the intake valve 15 for controlling an opening/closing operation of the intake valve. The actuator performs the opening/closing operation of the intake valve 15 in accordance with a control signal from the control unit (ECU).

A fuel injection valve 16 is attached in such a manner as to protrude toward the intake port 14. Fuel from the fuel injection valve 16 is injected to within the intake port 14. An intake manifold (corresponding to one of the intake manifolds 5a to 5d shown in FIG. 1) is connected to the upstream end opening of the intake port 14. A throttle bore 19 having an inner curved surface is provided in the intake manifold 5 at upstream of the fuel injection valve 16. A throttle valve 20 is provided within the throttle bore 19. The throttle valve 20 has two halves 20a and 20b with respect to the rotation axis. In the following description, one half 20a of the throttle valve 20 is referred to as a right-side half and the other half 20b of the throttle valve 20 is referred to as a left-side half.

A combustion chamber 22 is formed between a piston 21 within the cylinder 2 and the cylinder head 12. Air-fuel mixture of air introduced through the throttle valve 20 and fuel injected from the fuel injection valve 16 is burned in the combustion chamber 22.

For the purpose of convenience in the following description, positions P1 to P4, Q1 to Q2 are defined. The position Q1 indicates one example of an upstream position of the throttle valve 20. In this example, the position Q1 corresponds to the upstream end of the curved surface of the throttle bore 19. The position Q2 indicates one example of a downstream position of the throttle valve 20. In this example, the position Q2 corresponds to the downstream end of the curved surface of the throttle bore 19. The position P1 is defined correspondingly to the position Q1. A line P11-P12 passing through the positions P1 and Q1 is perpendicular (orthogonal) to a flow 24 of air passing through the intake manifold 5. The position P2 is defined correspondingly to the position Q2. A line P21-P22 passing through the positions P2 and Q2 is perpendicular to the flow 24 of air passing through the intake manifold 5.

The position P4 and the position Q5 are located on an open face 25 (which is a boundary of the cylinder head 12) at which the intake manifold 5 communicates with the intake port 14. In the figure, the positions P4 and Q5 indicate points at which an upper side and a lower side of the intake manifold 5 connect with an upper side and a lower side of the intake port 14, respectively. The position P5 is defined correspondingly to the position Q5. A line P51-P52 passing through the positions P5 and Q5 is perpendicular to the air flow 24 entering the intake port 14.

FIG. 2(b) shows a cross section of the intake manifold 5 taken along the line P11-P12. The area of the cross section (that is, an opening area) is represented with S1. The cross sectional area S1 is, for example, 55Φ (55 mm in diameter). FIG. 2(c) shows a cross section of the intake manifold 5 taken along the line P21-P22. The area of the cross section (an opening area) is represented with S2. The cross sectional area S2 is, for example, 60Φ (60 mm in diameter). On the other hand, a cross section 26 of the intake port 14 taken along the line P51-P52 is defined in FIG. 2(a). The area of the cross section 26 is represented with S3.

In the present invention, the cross sectional area S1 of the intake manifold 5 shown in FIG. 2(b) and the cross sectional area S2 of the intake manifold 5 shown in FIG. 2(c) are structured to be larger than the cross sectional area S3 at the position P5 located at the upstream end of the intake port 14 (that is, S3<S1 and S3<S2).

Such a structure is used so as to make the amount of air flow that passes through the throttle valve 20 larger than the amount of air flow that enters the intake port 14 at least when the throttle valve 20 is full open.

Preferably, a cross sectional area of the passage from the upstream position P1 of the throttle valve 20 to the position at which the cross section 26 having the cross sectional area S3 is defined is structured to be larger than the cross sectional area S3 of the intake port 14. Such a structure enables the amount of air flow captured when passing through the throttle vale to be brought to the cross section 26 of the intake port 14.

In the above-described embodiment, the line P51-P52 is defined to pass through only the intake port 14 and the area of the cross section 26 of the intake port 26 taken along the line P51-52 is used as S3. Alternatively, as shown in FIG. 2(d), a position Q4 is defined correspondingly to the position P4. The area of a cross section 27 of the intake manifold 5 taken along a line P41-P42 that is perpendicular to the air flow 24 may be used as S3. Thus, the area of a cross section defined in any point within a range from the position P4 to the position P5 that represent the upstream end of the intake port 14 may be used as S3.

Figure 3:
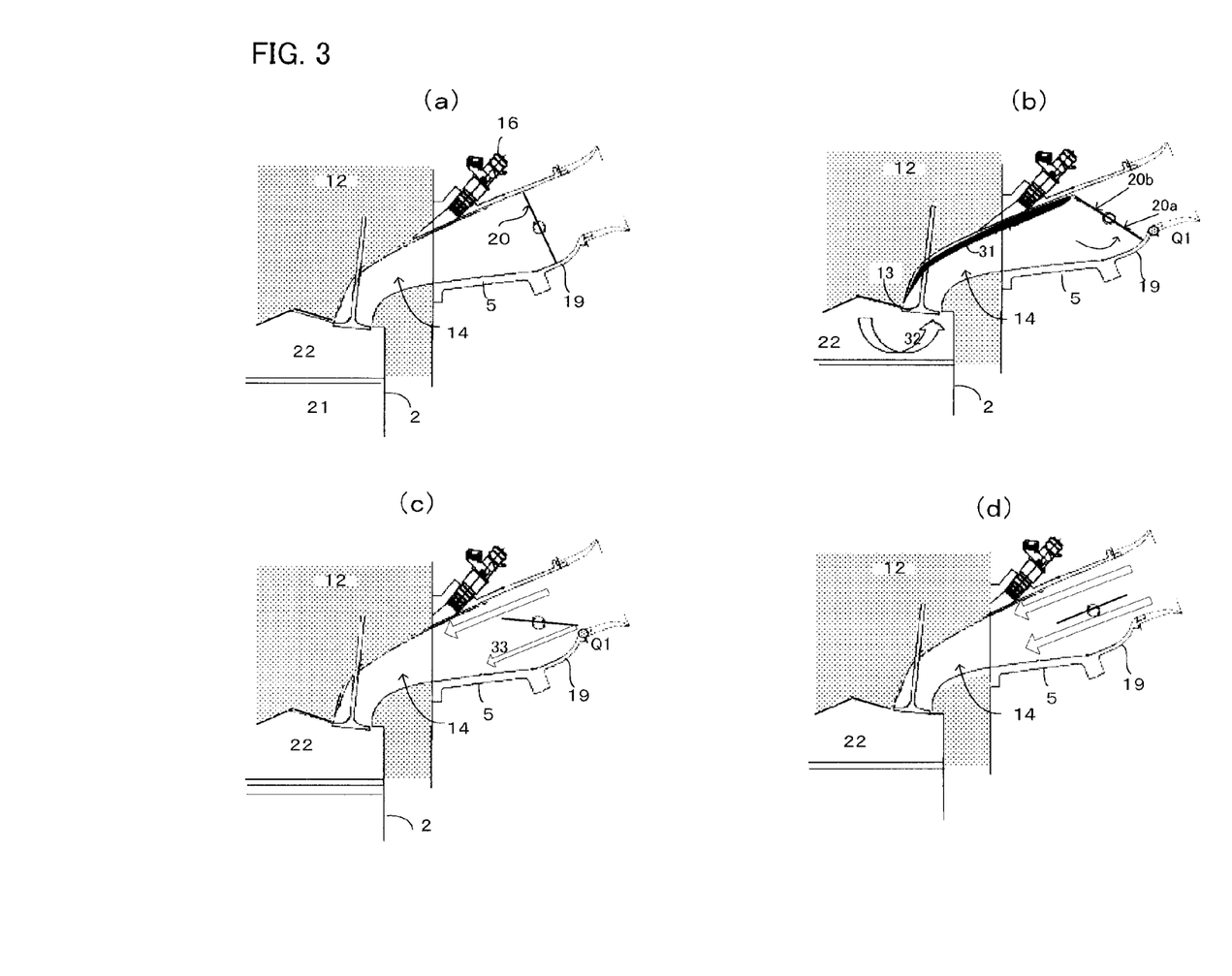
FIG. 3 schematically shows a behavior of an intake air amount controlling apparatus in accordance with one embodiment of the present invention.

Referring to FIG. 3, operation of the intake air amount controlling apparatus as shown in FIG. 2 will be described.

FIG. 3(a) shows a state where the throttle valve 20 is in a fully closed position. As shown in FIG. 3(b), in response to an accelerator pedal (not shown) being slightly depressed, the throttle valve 20 rotates. Because the right-side half 20a of the throttle valve 20 contacts with the curved surface of the throttle bore 19, an passage through the right-side half 20a toward the intake port 14 is closed. In contrast, a passage through the left-side half 20b of the throttle valve 20 toward the intake port 14 is slightly opened to allow a smaller amount of air to flow. Because the cross sectional area of the opened passage is smaller, this air flow is a thin air flow that runs along one side (upper side in the figure) in the intake manifold 5 and the intake port 14 as shown by reference numeral 31. Such a thin air flow runs at a high speed through the intake port 14 and the intake inlet 13 toward almost a center of the combustion chamber 22, so that a tumble flow, which rotates in the axial direction of the cylinder as shown by reference numeral 32, can be generated. By effect of the tumble flow, air and fuel are mixed well, which can improve the combustion efficiency.

Thus, when the engine load is low and the opening degree of the throttle valve 20 is smaller than a predetermined value, one half 20a of the throttle valve 20 contacts with the curved surface of the throttle bore 19 so that only a passage through the other half 20b is opened. This structure enables a smaller amount of air to be introduced at a high speed into the cylinder so that a tumble flow can be generated.

As shown in FIG. 3(c), when the accelerator pedal is further depressed, the right-side half 20a of the throttle valve 20 leaves the curved surface of the bore 19 (at the position Q1) and the passage through the right-side half 20a toward the intake port 14 is opened. As indicated by arrow 33, the air flow passes through not only the passage through the left-side half 20b but also the passage through the right-side half 20a. As the throttle valve 20 rotates, the opening of the passages by both of the left-side half 20b and the right-side half 20a of the throttle valve 20 increases and hence the amount of air passing through the throttle valve 20 increases. FIG. 3(d) shows a state where the throttle valve 20 is in a fully opened position. If the depression of the accelerator pedal is released, the throttle valve 20 rotates in the opposition direction.

Thus, in the operating condition where an engine load is high and/or when an engine rotational speed is high, the opening degree of the throttle valve 20 is controlled to be larger in accordance with a request from an engine for a larger amount of intake air. Because the cross sectional areas S1 and S2 at upstream and downstream of the throttle valve 20 are larger than the cross sectional area S3 at the upstream end of the intake port 14 as described above referring to FIG. 2, a shortage of the amount of air passing through the throttle valve 20 with respect to the amount of air entering the intake port 14 is prevented at least when the throttle valve 20 is full open. Therefore, a desired amount of air can be introduced into the cylinder.

Conventionally, as a result of configuring the intake air amount controlling apparatus such that providing the throttle bore allows generation of a tumble flow, the cross sectional area S1 and/or the cross sectional area S2 are formed to be smaller than the cross sectional area S3. Because the amount of air passing through the throttle valve may be smaller with respect to the amount of air entering the intake port 14, the amount of air introduced into the cylinder may be short especially when a larger amount of intake air is requested by the engine. According to the present invention, such a shortage of the intake air amount can be prevented because the intake air amount controlling apparatus having the throttle bore to generate a tumble flow is configured such that the cross sectional areas S1 and S2 are larger than the cross sectional area S3. Further, because there is no resistance in the downstream of the throttle valve 20, the air can smoothly flow toward the intake port 14 while keeping the amount of air captured when passing through the throttle valve.

Thus, according to the intake air amount controlling apparatus of the present invention, a shortage of the intake air amount actually introduced into the cylinder can be prevented when a requested intake air amount is larger while generating a tumble flow when a requested intake air amount is smaller.

Although the cross sectional area S2 is set to be larger than the cross sectional area S1 in this embodiment, the present invention is not limited to this condition. Any embodiment where the cross sectional areas of the intake manifold at upstream and downstream of the throttle valve are larger than the cross sectional area at the upstream end of the intake port is included in the scope of the present invention because such an embodiment enables that the amount of air passing through the throttle valve is larger than the amount of air entering the intake port.

FIG. 4(a) shows an intake air amount controlling apparatus in accordance with a second embodiment of the present invention. FIG. 4(b) shows a cross section of the intake manifold 5 taken along the line P11-P12. FIG. 4(c) shows a cross section of the intake manifold 5 taken along the line P21-P22. FIG. 4(b) is the same as FIG. 2(b). This embodiment is different from the first embodiment in that a rectification partition 41 is provided. The rectification partition 41 is placed downstream of the throttle valve 20 and adjacent to the throttle bore 19.

The rectification partition 41 is provided such that the air flow amount captured for entering the intake port 14, which is described referring to the first embodiment, is not reduced. More specifically, the rectification partition 41 is provided such that a cross sectional area (that is, an opening area) that is equal to or larger than the area S3 of the cross section 26 defined at the upstream end of the intake port is obtained at a position (from P2 to P3) at which the rectification partition 41 is placed. In other words, as shown in FIG. 4(c), the rectification partition 41 is provided such that a cross sectional area of a passage 42 above the rectification partition 41 is equal to or larger than S3.

In this embodiment, the cross sectional area S1 at the position P1<the cross sectional area S2 at the position P2, S3<S1, and S3<S2. Therefore, the upstream end and the downstream end of the rectification partition 41 are positioned such that the passage 42 is formed to have a cross sectional area that is at least equal to or larger than the cross sectional area S1. Thus, the passage 42 having a cross sectional area equal to or larger than S3 is obtained above the rectification partition 41.

Figure 4:
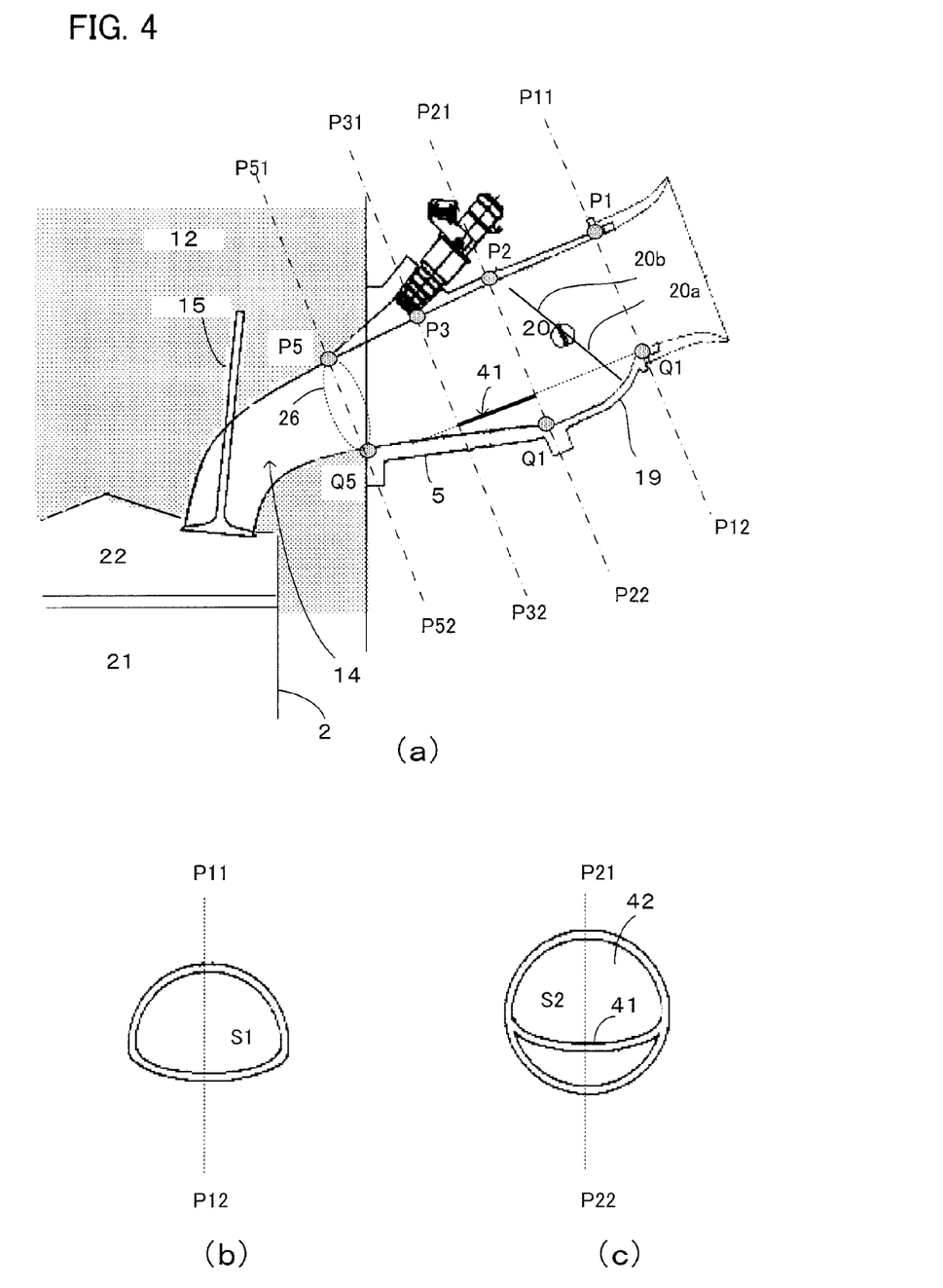
FIG. 4 shows an intake air amount controlling apparatus of an engine in accordance with a second embodiment of the present invention.

Thus, even when the rectification partition 41 is provided, the amount of air flow can be kept from the throttle valve 20 to the intake port 14. Moreover, the rectification partition 41 is not a resistance against the amount of air flow thus kept. Therefore, an advantage of preventing a shortage of the amount of air flow introduced into the intake port 14, as described in the first embodiment, can be achieved.

As described in the first embodiment, forming the throttle bore in a curved surface, a tumble flow can be generated when the opening degree of the throttle valve 20 is smaller. However, as the opening degree of the throttle valve becomes larger after the right-side half 20a of the throttle valve leaves the curved surface, the air may be stagnant and/or a swirl may occur in the throttle bore 19. As a result, a smooth flow toward the intake port 14 having the amount captured when passing through the throttle valve may be hindered.

By providing the rectification partition 41 adjacent to the throttle bore 19 as shown in FIG. 4, an air flow toward the intake port 14 having the amount thus captured is separated from the air that is stagnant in the throttle bore 19. Thus, the air flow toward the intake port 14 is smoothed. Further, when a tumble flow is generated, a smaller amount of air that has passed through the left-side half 20b of the throttle valve 20 can flow toward the intake port 14 without being caught in the bore 19.

Figure 5:
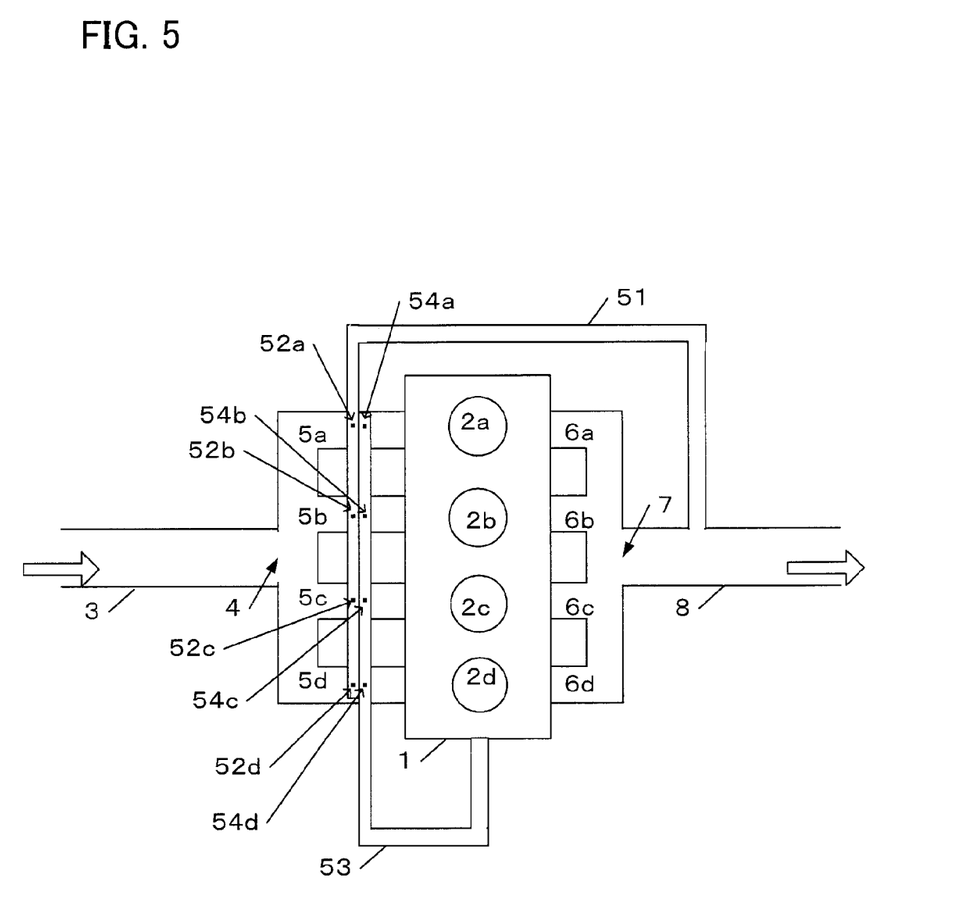
FIG. 5 schematically shows an engine in accordance with another embodiment of the present invention.

FIG. 5 schematically shows an engine in accordance with another embodiment of the present invention. Only differences from FIG. 1 will be described. An exhaust passage 7 in which exhaust manifolds 6a to 6d from the individual cylinders 2a to 2d collect is connected with the intake manifolds 5a to 5d of the individual cylinders through an EGR passage 51. Through the EGR passage, exhaust gas in the exhaust passage 7 is re-circulated to the intake manifolds 5a to 5d and supplied to the individual cylinders. Black dots shown by reference numerals 52a to 52d on the EGR passage 51 indicate apertures from the EGR passage 51 to the intake manifolds 5a to 5d. According to a control signal from the ECU, the amount of the re-circulated exhaust gas can be adjusted by an EGR valve (not shown) that is provided in the EGR passage 51. Alternatively, an EGR passage may be provided for each of the cylinders such that each of the exhaust manifolds 6a to 6d is connected to a corresponding one of the intake manifolds 5a to 5d.

A blow-by (PCV) passage 53 is provided between a crankcase (not shown) of the engine 1 and the intake manifolds 5a to 5d of the individual cylinders 2a to 2d. The PCV passage 53 re-circulates the blow-by gas that has leaked into the crankcase of the engine 1 to the intake manifolds 5a to 5d. Black dots shown by reference numerals 54a to 54d on the PCV passage 53 indicate apertures from the PCV passage 53 to the intake manifolds 5a to 5d. According to a control signal from the ECU, the amount of the re-circulated blow-by gas can be adjusted by a PCV (Positive Crankcase Ventilation) valve (not shown) that is provided in the PCV passage 53.

Figure 6:
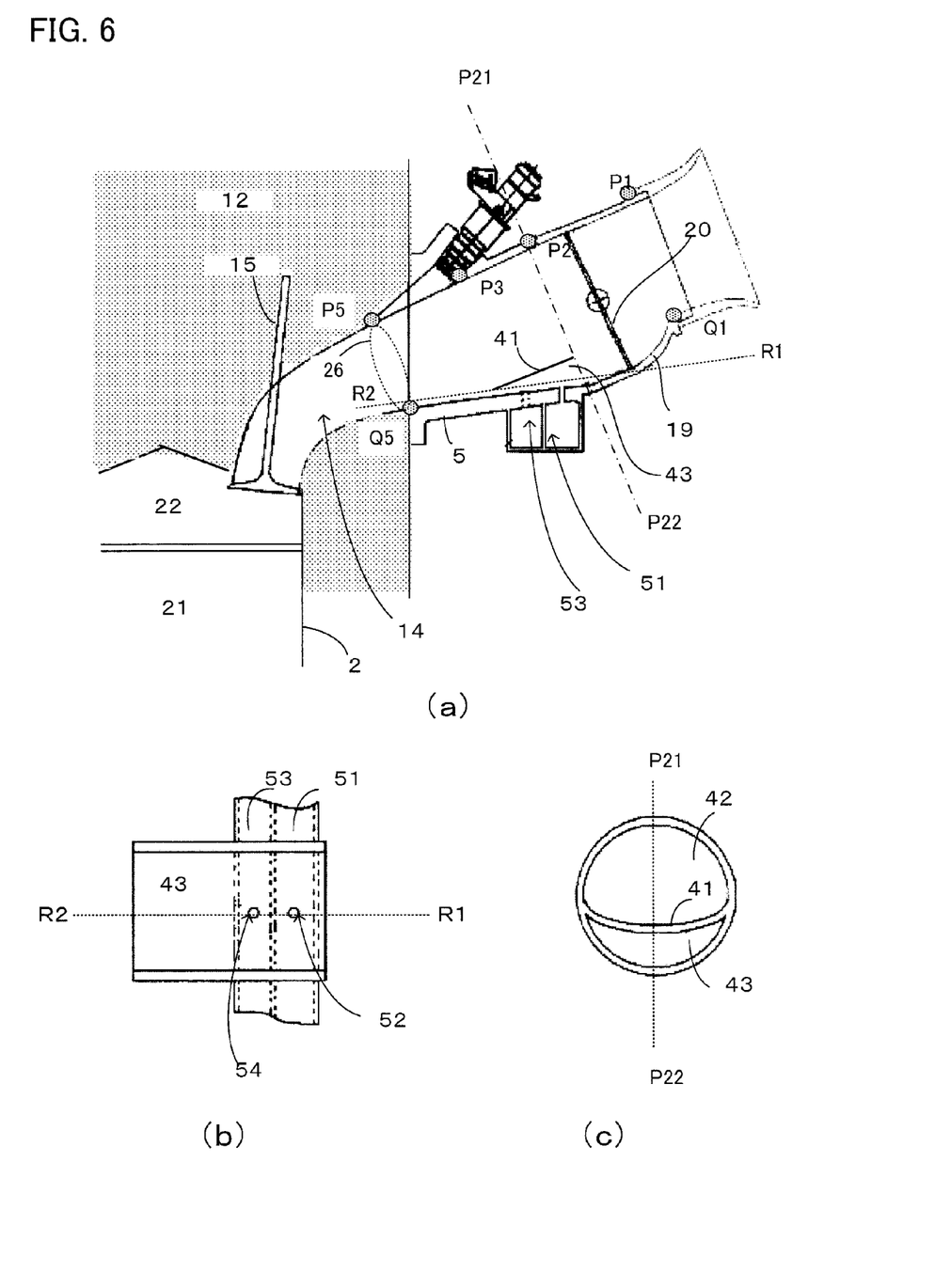
FIG. 6 shows an intake air amount controlling apparatus of an engine in accordance with a third embodiment of the present invention.

FIG. 6 shows an intake air amount controlling apparatus in accordance with a third embodiment of the present invention when an EGR passage and a blow-by passage as shown in FIG. 5 are connected to the intake manifold of each cylinder. This embodiment is different from the second embodiment in that the EGR passage 51 and the PCV passage 53 are connected to the intake manifold 5. FIG. 6(c) is the same as FIG. 4(c).

FIG. 6(b) shows a top view of a portion at which the EGR passage 51 and the PCV passage 53 are connected to the intake manifold 5 when the intake manifold 5 is cut along a line R1-R2. The EGR gas from the EGR passage 51 is supplied to the intake manifold 5 through an aperture 52 (corresponding to the apertures 52a to 52d of FIG. 5) and the blow-by gas from the PCV passage 53 is supplied to the intake manifold 5 through an aperture 54 (corresponding to the apertures 54a to 54d of FIG. 5).

The rectification partition 41 partitions the intake manifold 5 into an upper passage 42 above the rectification partition 41 and a lower passage 43 below the rectification partition 41. As described above referring to the second embodiment, the cross sectional area of the upper passage 42 is equal to or larger than S3. Fresh air via the throttle valve 20 flows through the upper passage 42 toward the intake port 14. On the other hand, because the apertures 52 and 54 communicate with the lower passage 43, the EGR gas and the blow-by gas supplied through the apertures 52 and 54 flow through the lower passage 43 below the rectification partition 41 toward the intake port 14.

Thus, the EGR gas and the blow-by gas are introduced into the intake port 14 through a passage other than the passage that is provided for the fresh air. Therefore, a smooth flow of the fresh air secured through the cross sectional area equal to or larger than the cross sectional S3 is not disturbed by the EGR gas and the blow-by gas.

Preferably, the aperture 52 of the EGR passage 51 is provided upstream of the aperture 54 of the blow-by passage 53. This can prevent the blow-by gas to enter the EGR passage 51. Thus, it is prevented that oil included in the blow-by gas carbonizes the EGR gas. It is also prevented that oil included in the blow-by gas sticks to and clogs the aperture 52 of the EGR passage.

Figure 7:
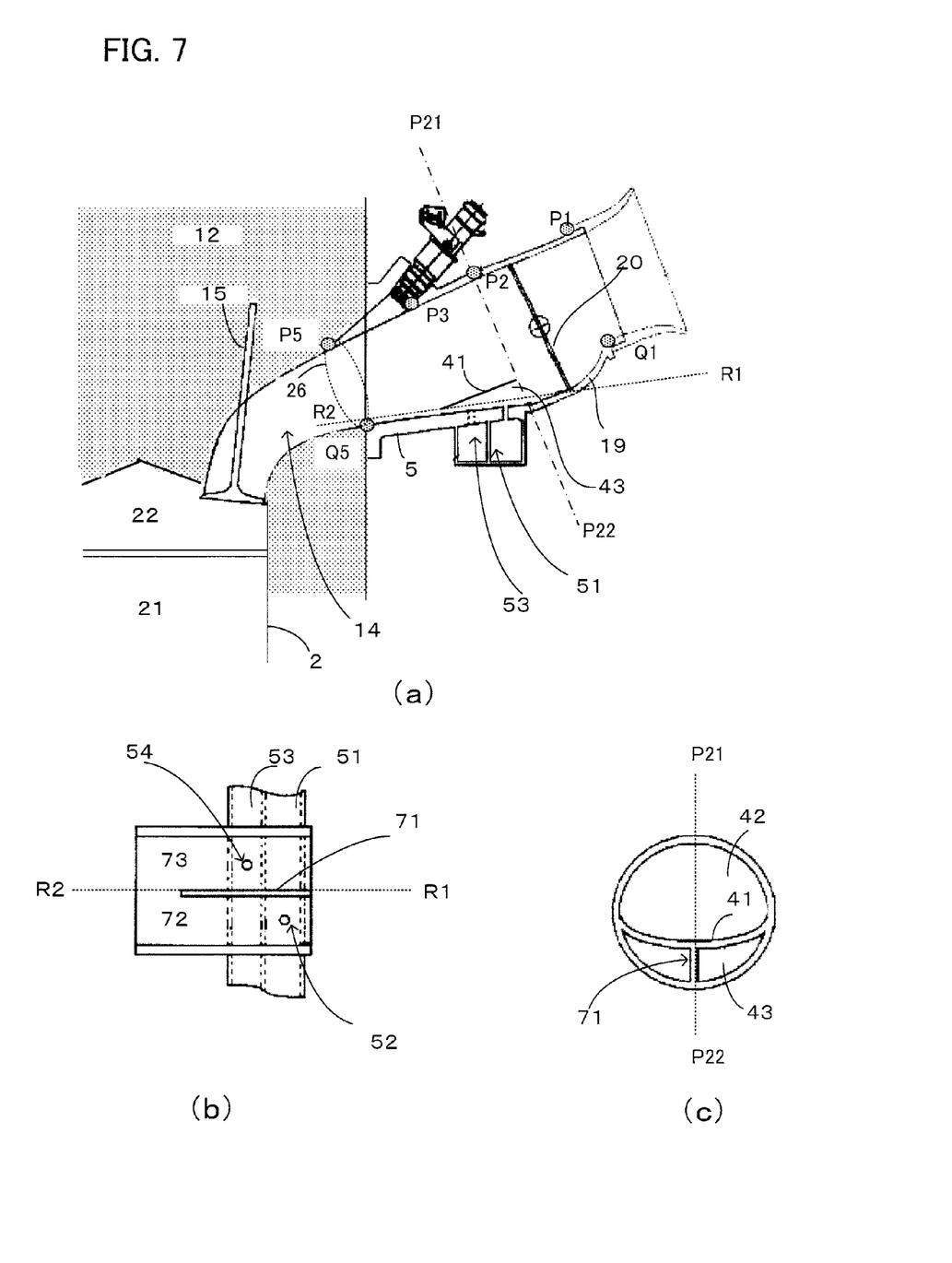
FIG. 7 shows an intake air amount controlling apparatus of an engine in accordance with a fourth embodiment of the present invention.

FIG. 7 shows an intake air amount controlling apparatus in accordance with a fourth embodiment of the present invention. As shown in FIGS. 7(b) and 7(c), this embodiment is different from the third embodiment in that a separator plate 71 is provided in the lower passage 43 below the rectification partition 41 to form a first passage 72 and a second passage 73. According to this arrangement, the EGR gas and the blow-by gas flow through the first passage 72 and the second passage 73, respectively. Thus, the EGR gas and the blow-by gas supplied to the intake manifold 5 flow toward the intake port 14 through the different passages. Thus, it is more surely prevented that oil included in the blow-by gas carbonizes the EGR gas. It is more surely prevented that oil included in the blow-by gas sticks to and clogs the aperture 52 of the EGR passage.

Figure 8:
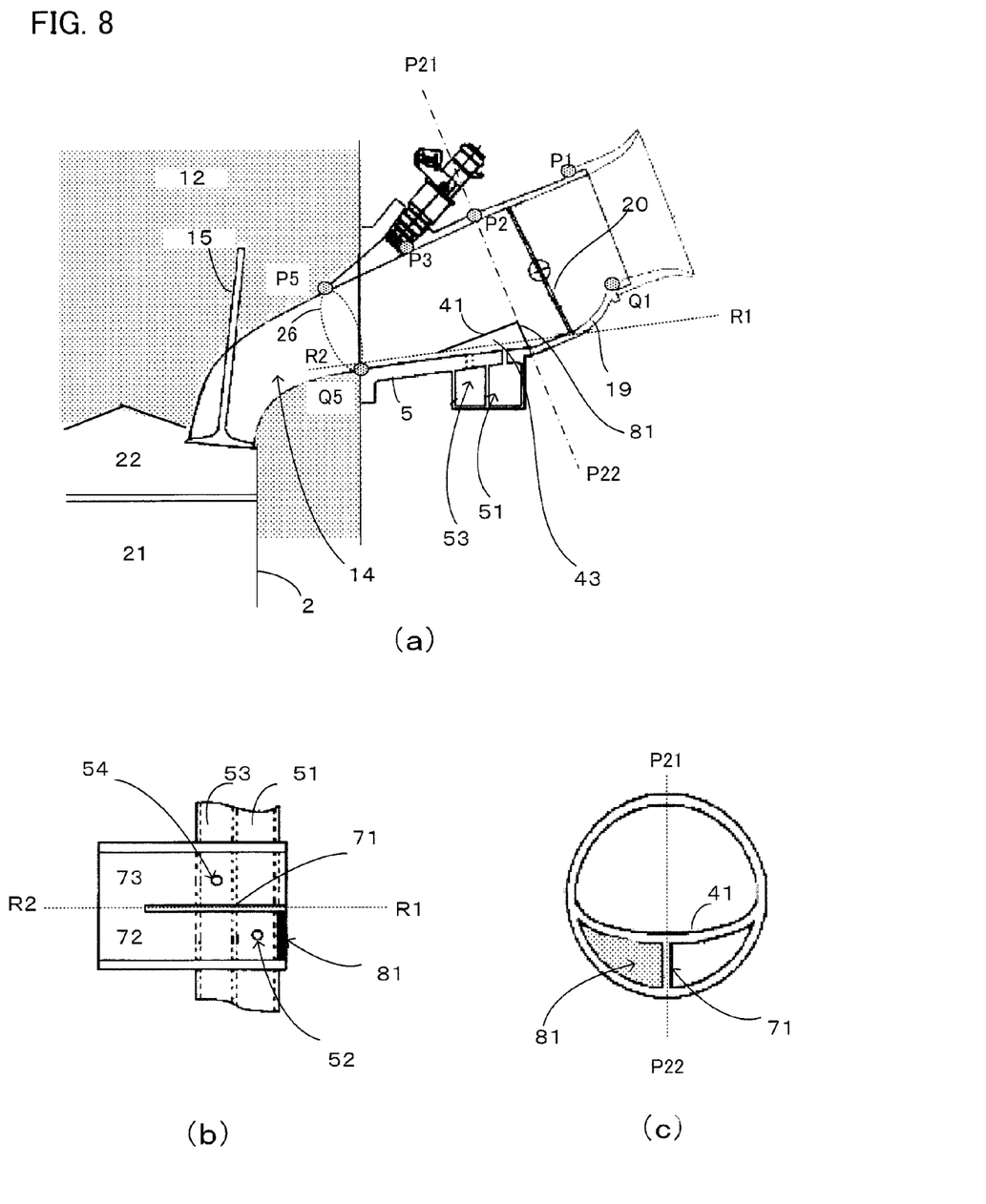
FIG. 8 shows an intake air amount controlling apparatus of an engine in accordance with a fifth embodiment of the present invention.

FIG. 8 shows an intake air amount controlling apparatus in accordance with a fifth embodiment of the present invention. This embodiment is different from the fourth embodiment in that a shield plate 81 is further provided upstream of the aperture 52 at which the EGR passage 51 connects to the first passage 72. Such a structure can prevent the EGR gas supplied to the intake manifold 5 from returning to the upstream of the intake manifold 5. Further, it is prevented that the EGR gas hits the throttle valve 20 to cause the carbon to stick to the throttle valve.

The shield plate 81 may be provided upstream of the aperture 54 at which the PCV passage 53 connects to the second passage 73. Such a structure can prevent oil included in the blow-by gas from returning to the upstream of the intake manifold. It is prevented that oil in the blow-by gas sticks to the throttle valve. Alternatively, the shield plate may be provided upstream of both of the apertures 52 and 54 of the first and second passages 72 and 73.

Further, the shield plate 81 may be provided upstream of the apertures 52 and 54 shown in the third embodiment in FIG. 6. Such a structure can prevent the EGR gas and the blow-by gas supplied to the lower passage 43 from returning to the upstream of the intake manifold.

It should be noted that only one of the EGR passage 51 and the PCV passage may be provided in the third to fifth embodiments that have been described above referring to FIG. 5 through FIG. 8. In this case, one of the EGR gas and the blow-by gas is supplied to the lower passage 43 below the rectification partition 41. The shield plate 81 may be provided upstream of the lower passage 43.

It should be also noted that the above-described embodiments of the present invention can be applied to a direct injection engine. Further, the above-described embodiments can be applied to a general-purpose internal-combustion engine (such as an outboard motor or the like).

What is claimed is:

1. An intake air amount controlling apparatus of an internal-combustion engine, the apparatus comprising:
    an intake manifold that is branched from an intake manifold collecting portion of the engine, the intake manifold communicating with an intake port of a cylinder head of a corresponding cylinder;
    a throttle valve provided in the intake manifold of the cylinder; and
    a throttle bore provided in the intake manifold, the throttle bore having a curved surface,
    wherein the throttle valve rotates such that one half of the throttle valve contacts with the curved surface of the throttle bore until the throttle valve reaches a predetermined opening degree, thereby preventing an air flow via the one half of the throttle valve from entering the intake port while allowing an air flow via the other half of the throttle valve to enter the intake port; and
    wherein areas of cross sections, which are orthogonal to an air flow passing through the intake manifold, of the intake manifold at an upstream end and a downstream end of the curved surface of the throttle bore are larger than an area of a cross section, which is orthogonal to an air flow entering the intake port, crossing an open face at which the intake manifold communicates with the intake port.

2. The intake air amount controlling apparatus of claim 1, further comprising a rectification partition provided downstream of the throttle valve, the rectification partition stabilizing the air flow passing through the throttle valve and toward the intake port,
    wherein the rectification partition is provided such that an area of a cross section, which is orthogonal to the air flow passing through the intake manifold, of the intake manifold at a position at which the rectification partition is placed is larger than the area of the cross section crossing the said open face.

3. The intake air amount controlling apparatus of claim 2, wherein the rectification partition is provided to form, in the intake manifold at downstream of the throttle valve, a branch passage that is branched from a passage having the area of the cross section crossing the open face,
    wherein one or both of an EGR gas and a blow-by gas is supplied to the branch passage.

4. The intake air amount controlling apparatus of claim 3, wherein, when both of the EGR gas and the blow-by gas are supplied, the branch passage is further partitioned by a separator plate into individual passages such that each of the EGR gas and the blow-by gas is supplied to a corresponding one of the individual passages.

5. The intake air amount controlling apparatus of claim 3, wherein an upstream end of one or both of the passage for supplying the EGR gas and the passage for supplying the blow-by gas is shielded by a shield plate.

* * * * *